United States Patent Office 3,418,414
Patented Dec. 24, 1968

3,418,414
TRIMETHYLSILYL ETHERS OF LINCOMYCIN
AND ITS COMPOUNDS
Ronald L. Houtman, Parchment, Mich., assignor to The
Upjohn Company, Kalamazoo, Mich., a corporation of
Delaware
No Drawing. Filed Aug. 31, 1966, Ser. No. 576,238
15 Claims. (Cl. 424—181)

ABSTRACT OF THE DISCLOSURE

Trimethylsilyl ethers of free base and acid addition salt forms of compounds of the formula

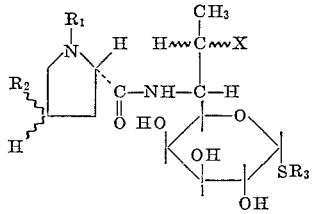

wherein $R_1$ is selected from the group consisting of hydrogen and alkyl containing 1 to 8 carbon atoms, inclusive; $R_2$ is alkyl containing 3 to 12 carbon atoms, inclusive; $R_3$ is selected from the group consisting of methyl and ethyl; and X is selected from the group consisting of chlorine, bromine and hydroxyl. The trimethylsilyl ethers show anti-infective activities and have uses among others in antimicrobial pharmaceutical preparations and methods, especially in aqueous and oily vehicles.

This invention relates to compositions of matter, more particularly trimethylsilyl ethers of lincomycin compounds.

Lincomycin is methyl 6,8-dideoxy-6-(1-methyl-trans-4-propyl-L-2-pyrrolidinecarboxamido) - 1 - thio-D-erythro-α-D-galacto-octopyranoside. It is represented by the following structural formula:

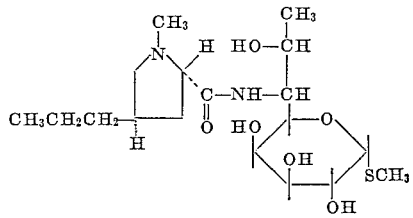

Both free base and acid addition salt forms can be prepared by biosynthetic methods described in U.S. Patent 3,086,912. These forms have inappreciable solubility in lower alkanols such as ethanol and propanol, in organic solvents such as chloroform and diethyl ether, and in vegetable oils such as cottonseed and peanut oils. Hence, these forms are not advantageously adaptable in preparing alkanol, solvent and oil solutions of lincomycin compounds for use in impregnating paper and fabrics; in incorporating oily constituents into mammal and bird feeds; or in providing oil and solvent solutions which become antimicrobial upon contact by an acidic aqueous medium, for example weakly acidic washing and cleaning solutions, digestive juice, and the like.

It has now been found that, in accordance with the present invention, novel trimethylsilyl ethers of lincomycin compounds are unexpectedly useful in the aforesaid alkanol, solvent, oil and aqueous vehicles due at least in part to their releasing antimicrobial action slowly in the presence of acidic environments. The trimethylsilyl ethers are chemically and physically stable in slightly basic solutions, e.g., mildly alkaline soaps, and release antimicrobial activity upon slight acidification. They are likewise stable in aqueous suspension, from which they release anti-infective activity, under acidic conditions, for example, after oral ingestion by mammals. The novel compounds are the free base and acid addition salt forms of the trimethylsilyl ethers of compounds of the formula

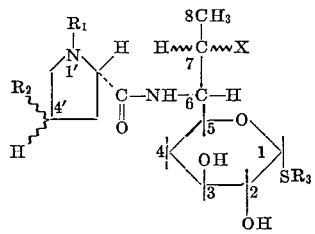

wherein $R_1$ is selected from the group consisting of hydrogen and alkyl containing 1 to 8 carbon atoms inclusive, $R_2$ is alkyl containing 3 to 12 carbon atoms inclusive, $R_3$ is selected from the group consisting of methyl and ethyl, and X is selected from the group consisting of chlorine, bromine, and hydroxyl. The attachment of the $R_2$ group is trans or cis to the carbonyl group as indicated by the wavy line bond symbol. The X group placement can show either the D-erythro or L-threo forms. Preferred among the generally disclosed compounds for silylation according to the herein described methods are those having substituents as follows:

TABLE I

| No. | $R_1$ (1'-N Position) | $R_2$ (4' Position) | $R_3$ (1 Position) | X (7 Position) |
|---|---|---|---|---|
| 1 | Methyl | n-Propyl | Methyl | Hydroxyl. |
| 2 | Ethyl | do | do | Do. |
| 3 | Hydrogen | do | do | Do. |
| 4 | Methyl | n-Butyl | do | Do. |
| 5 | do | n-Pentyl | do | Do. |
| 6 | Ethyl | do | do | Do. |
| 7 | Methyl | n-Hexyl | do | Do. |
| 8 | do | n-Propyl | do | Chloro. |
| 9 | Ethyl | do | do | Do. |
| 10 | Methyl | n-Pentyl | do | Do. |
| 11 | Ethyl | do | do | Do. |
| 12 | Methyl | n-Propyl | Ethyl | Hydroxyl. |

Other contemplated alkyl groups are heptyl, octyl, nonyl, decyl, undecyl, dodecyl, and their isomeric forms. The acid addition salt forms comprise the hydrochloride, sulfate, phosphate, acetate, succinate, lactate, maleate, fumarate and like nontoxic forms, prepared as in U.S. Patent 3,086,912.

Generally described, the manner and process of making the invention is to react the lincomycin compounds with a silylating agent in a solvent for the reactants and thereafter recover the silyl ether. An especially suitable silylating agent is hexamethyldisilazane with trimethylchlorosilane as catalyst. A useful solvent is pyridine, preferably anhydrous. Excess hexamethyldisilazane, i.e. above the stoichiometric amount, is preferably used to obviate adverse effects of any traces of moisture in the reaction medium. Silylation at the available hydroxyl groups occurs readily at from about 10° C. to about 60° C., resulting in the formation of the tetra-substituted trimethylsilyl ether compound. Hence, one type of silylating process comprises subjecting lincomycin compounds with the four available hydroxyls to silylation, and subsequently, depending upon the degree of acidic hydrolysis of the tetra-substituted ether, obtaining other ethers, namely tri-, di- and mono-substituted ethers.

It is also possible to silylate lincomycin compounds in which the available hydroxyl groups have been reduced in number by use of blocking agents or by replacement by other substituents. For example, substitution of the 7-position hydroxyl by chlorine gives a 7-chloro-7-deoxylincomycin compound from which the 2,3,4-trisubstituted ether can be prepared. Likewise, a diacetate can be used as starting material for the preparation of disilyl ethers.

For purification of the etherified compounds, the reaction mixture is concentrated in dryness and taken up in chloroform. The chloroform solution is washed with water and filtered through silica gel which retains impurities. The filtered chloroform solution is evaporated to dryness to yield the purified silyl ether.

In accordance with the foregoing manner and process of making the invention, the following exemplifications illustrate the best mode contemplated by the inventor for preparing the compositions of matter herein claimed.

EXAMPLE 1

Tetra(trimethylsilyl)ether of lincomycin

Ten gms. of lincomycin hydrochloride is dissolved in 100 ml. of dry pyridine and 15 ml. of hexamethyldisilazane and 2 ml. of trimethylchlorosilane is added. The reaction mixture is stirred vigorously for about 2 hours. Two hundred ml. of chloroform is dissolved in the mixture and pyridine is removed by washing with water. Recovery of the tetra(trimethylsilyl) compound is obtained by evaporation of the chloroform solution to dryness. The dry residue is dissolved in methanol-chloroform (1:40) and chromatographed over silica gel to yield an eluate from which crystalline 2,3,4,7-tetrakis-O-(trimethylsilyl)-lincomycin is obtained upon evaporation to dryness.

*Analysis.*—Calcd. for $C_{30}H_{66}O_6N_2SSi_4$: C, 51.82; H, 9.57; N, 4.03; S, 4.61; M. Wt. 695.15. Found: C, 51.65; H, 9.58; N, 4.03; S, 4.72; Eq. Wt. 700. $[\alpha]_D +111°$ (c., 1, chloroform).

Ethanolic solutions administered orally to mice, 100 mg./kg., provided blood levels of lincomycin up to 3.2 mcg./ml. In dogs, at 100 mg./kg., capsules and ethanolic solutions provided levels of 15 and 23 mcg./ml., respectively.

EXAMPLE 2

Tris(trimethylsilyl)ethers of lincomycin (A) Five gms. of 2,3,4,7-tetrakis-O-(trimethylsilyl) lincomycin (see Example 1) is dissolved in 100 ml. of methanol. Five ml. of 6 N acetic acid is added and hydrolysis is followed by gas chromatography. After 48 hours the reaction is essentially complete. The trimethylsilyl compound is isolated and purified by evaporation of the methanol and acetic acid, redissolving the material in chloroform and washing with water. Thereafter the chloroform solution is filtered through silica gel to yield a filtrate which upon evaporation provides dry crystalline 2,3,4-tris-O-(trimethylsilyl)lincomycin.

*Analysis.*—Calcd. for $C_{27}H_{58}O_6N_2SSi_3$: C, 52.05; H, 9.38; N, 4.50; S, 5.15; M. Wt. 622.99. Found: C, 52.34; H, 9.22; N, 4.32; S, 5.26; Eq. Wt. 626.

$$[\alpha]_D(CHCl_3) + 121°$$

The $CD_{50}$ (medium protective dose), upon oral administration to mice infected with *S. aureus*, was found to be 27 mg./kg. of body weight (linomycin base equivalent is 18 mg./kg.). This finding is in contrast to and shows superiority over lincomycin hydrochloride which was found to be 29 mg./kg. of body weight (lincomycin base equivalent to 27 mg./kg.).

Oral dosing of dogs at 100 mg./kg. (lincomycin base equivalent) of the tris(trimethylsilyl)ether provided serum levels, mcg./ml. as lincomycin free base equivalent as follows:

| Dog | Hours | | | | | | |
|---|---|---|---|---|---|---|---|
| | 0 | ½ | 1 | 2 | 4 | 6 | 24 |
| 1 | <0.5 | <0.5 | 22.0 | 16.2 | 7.5 | 5.6 | <0.5 |
| 2 | <0.5 | 0.43 | 14.2 | 13.5 | 15.4 | 12.9 | <0.5 |
| 3 | <0.5 | 0.65 | 6.1 | 30.0 | 17.7 | 12.9 | 0.47 |

The aforesaid results are unexpected in view of the fact that the tris compound is but moderately active antibacterially in vitro.

(B) To 9.26 gm. (0.022 mole) of lincomycin base hemihydrate in 100 ml. pyridine at 5° C. was slowly added 3 ml. (0.032 mole) of acetic anhydride. The mixture was permitted to return slowly to room temperature and after standing overnight, it was evaporated to dryness under reduced pressure, and the residue was dissolved in 100 ml. of ethyl acetate. The solution was washed successively with 100 ml. of cold sodium bicarbonate solution and three 50-ml. volumes of water, dried and evaporated to dryness. The product (7 gm.) was distributed in a counter-current distribution apparatus, using the system ethyl acetate:cyclohexane:95% ethanol:water (27:23:30:20). After 500 transfers, small amounts of lincomycin triacetate and lincomycin had been removed, and the distribution was continued for a total of 100 transfers. All four mono-acetates were present, but only two became separated as pure materials.

One separated mono-acetate, believed to be the 2-acetate and designated as lincomycin acetate I, has a K. value of 0.27 and an optical rotation of $[\alpha]_D^{25} = +161°$ (c., 1, in chloroform).

*Analysis.*—Calcd. for $C_{20}H_{36}N_2O_7S$: C, 53.55; H, 8.09; N, 6.25; S, 7.15. Found: C, 52.64; H, 7.89; N, 6.12; S, 8.63.

Another separated mono-acetate, believed to be the 7-acetate and designated as lincomycinacetate II, has a K. value of 0.43 and an optical rotation of $[\alpha]_D^{25} = +167°$ (c., 1, in chloroform).

*Analysis.*—Calcd. for $C_{20}H_{36}N_2O_7S$: C, 53.55; H, 8.09; N, 6.25; S, 7.15. Found: C, 53.43; H, 8.25; N, 6.55; S, 7.30.

These mono-acetates are silylated in accordance with the procedure of Example 1. Thereafter the acetate radical is removed by dissolving the reaction product in methanol, adding a 10% solution of ammonium hydroxide in methanol, and monitoring the removal of the acetates by thin layer chromatography to yield 3,4,7-tris-O-(trimethylsilyl)lincomycin and the 2,3,4-tris-O-(trimethylsilyl) lincomycin.

EXAMPLE 3

Di(trimethylsilyl)ethers of lincomycin (A) One gm. of lincomycin 2,3,4-triacetate prepared as in Example 4, is placed in 50 ml. of 1 N hydrochloric acid and stored at room temperature for 5 hours. The solution is then brought to pH 8 with sodium bicarbonate and extracted exhaustively with five 25-ml. volumes of methylene chloride. This solution is washed with water and dried over sodium sulfate. Following removal of the desiccant and evaporation of the solvent, the glassy residue is further dried under high vacuum and then subjected to counter-current distribution using the solvent system ethyl acetate:cyclohexane:95% ethanol:water (2.7:2.3:3.0:2.0) for 500 transfers. Materials of K=0.266 and K=0.428 are separated, lincomycin monoacetate I and monoacetate II respectively.

The material under the curve at K=0.83 is separated. This is lincomycin 2,7-diacetate. Minimal inhibitory concentrations in mcg./ml. are as follows:

| | |
|---|---|
| *Streptococcus viridans* | 6.4 |
| *Staphylococcus albus* | 6.4 |
| *Staphylococcus albus* 151 | 3.2 |
| *Staphylococcus aureus* 80 | 12.5 |
| *Staphylococcus aureus* 552 | 12.5 |
| *Staphylococcus aureus* 771 | 25 |
| *Streptococcus faecalis* | 12.5 |

Median protective doses in mg./kg. of body weight in *Staphylococcus aureus* 284-infected mice are about 37 subcutaneously and about 71 orally.

The lincomycin diacetate is silylated in accordance with the procedure of Example 1. The acetate groups are removed and the disilylated compound is recovered in accordance with the procedures of Examples 1 and 2 to yield 3,4-bis-O-(trimethylsilyl)lincomycin.

(B) A solution of 9.8 gm. of lincomycin in 150 ml. of acetone is added to a solution of 9.8 gm. of p-toluenesulfonic acid monohydrate in 100 ml. of acetone with good stirring and avoidance of exposure to moisture. The mixture is stirred at ambient temperature for one hour, after which 100 ml. of anhydrous ether is added and stirring is continued in an ice-bath for 0.5 hour. The mixture is filtered and the solid is dried in vacuo at 50° C.; yield 13.35 gm. (85.5%) of 3,4-O-isopropylidenelincomycin p-toluenesulfonate. An additional 1.15 gm. (7.4%) can be recovered from the mother liquors by adding 350 ml. of anhydrous ether to the mother liquor from the previous filtering operation and chilling the solution for one hour. The 14.5 gm. so obtained are suspended in 200 ml. of ether and shaken vigorously with 125 ml. of 5% potassium bicarbonate solution. The aqueous layer is back-extracted with two 100-ml. portions of ether. The ether extracts are washed with 50 ml. of saturated sodium chloride solution and then filtered through anhydrous sodium sulfate. The ether is evaporated under vacuum, leaving 7.9 gm. (73.1%) of 3,4-O-isopropylidenelincomycin which is dissolved in 25 ml. of ethyl acetate and concentrate to about 10 to 15 ml. The concentrate is allowed to stand at room temperature for several hours and then refrigerated overnight. The crystals are filtered from the solution and washed sparingly with cold ethyl acetate; yield 4.55 gm. (42.2%) of 3,4-O-isopropylidenelincomycin having a melting point of 126–128° C., and an optical rotation of $[\alpha]_D^{25}$ +101–102° (c., 1, methylene chloride).

A solution of 2 gm. of 3,4-O-isopropylidenelincomycin and 1 ml. of acetic anhydride in 10 ml. of pyridine was heated 4 hours at 80° C. After standing overnight at room temperature, the reaction mixture was stirred one hour with 1 ml. of water, then evaporated to dryness under reduced pressure. The residue was dissolved in 20 ml. of ethyl acetate and the solution was washed with 1 volume of cold 5% sodium bicarbonate solution, then several times with 10-ml. portions of cold water, and evaporated to dryness under reduced pressure. The residue was dissolved in 100 ml. of ether to which was added gaseous dry hydrogen chloride until no further precipitate formed. The precipitate was stirred with ether and dried under vacuum to yield 800 mg. of 3,4-O-isopropylidenelincomycin 2,7-diacetate hydrochloride.

Analysis. — Calcd. for $C_{25}H_{42}N_2O_9S \cdot HCl \cdot H_2O$: C, 51.30; H, 7.75; Cl, 6.06; S, 5.48. Found: C, 51.61; H, 7.76; Cl, 6.37; S, 5.50.

3,4-O-isopropylidenelincomycin 2,7-diacetate hydrochloride (3.7 gm.) was dissolved in 25 ml. of water and sufficient 1 N hydrochloric acid was added to form a solution (pH 0.5) which was allowed to stand at room temperature for 5 hours. The solution was then freeze-dried and the residue was partially dissolved with ether, cooled and treated with excess dry hydrogen chloride. The precipitate was dissolved in chloroform, boiled to azeotropically distill traces of water, and the remaining chloroform solution was treated with ether to precipitate 3.9 gm. of material in two crops. This was further dried in vacuo to yield lincomycin 2,7-diacetate hydrochloride having a melting point of 141–146° C., an optical rotation of $[\alpha]_D^{25}$=+118° (c., 1, water) and the following elemental analysis:

Analysis.—Calcd. for $C_{22}H_{38}N_2O_8S \cdot HCl$: C, 50.13; H, 7.45; N, 5.32; S, 6.08; Cl, 6.73. Found: C, 49.28; H, 7.66; N, 5.54; S, 5.80; Cl, 7.72.

Upon treating lincomycin 2,7-diacetate hydrochloride with sodium hydroxide, lincomycin 2,7-diacetate is obtained Also, upon treating lincomycin 2,7-diacetate hydrochloride with a strong basic anion exchange resin, as described previously, lincomycin 2,7-diacetate is obtained. Lincomycin 2,7-diacetate has a distribution coefficient of K=0.83 in the system ethyl acetate:cyclohexane:95% ethanol:water (2.7:2.3:3.0:3.0).

Dissolve 10 gm. of lincomycin 2,7-diacetate in 100 ml. pyridine. Add 20 ml. of hexamethyldisilazane and 10 ml. of trimethylchlorosilane. After 10 minutes, remove the pyridine by evaporation, redissolve the residue in chloroform and wash the chloroform solution several times with water. Remove the chloroform by evaporation and recrystallize the residue from ethanol-water to yield the 3,4-bis-O-(trimethylsilyl)ether. The acetate groups are removed in accordance with the procedure of Example 2 to yield 3,4-bis-O-(trimethylsilyl)lincomycin.

EXAMPLE 4

*Mono(trimethylsilyl)ethers of lincomycin*

(A) To a solution of 2 gm. of lincomycin in 10 ml. of pyridine was added 3 ml. of acetic anhydride. The mixture was heated 6 hours on a steam bath, cooled to room temperature and stirred 1 hour after the addition of 1 ml. of water. Removal of solvents left a thick syrup which was dissolved in 10 ml. of ethyl acetate and washed first with 10 ml. of ice-cold 5% aqueous sodium bicarbonate solution, then 3 times with 10 ml. portions of water. The solution was finally dried over anhydrous sodium sulfate and evaporated on a rotary evaporator to dryness. The residue was further dried overnight in a vacuum desiccator after which it was dissolved in 75 ml. of dry ether and, while cooling in ice, treated with dry hydrogen chloride until no further granular precipitate formed. The precipitate was immediately filtered, washed three times with 50 ml. portions of dry ether and dried in vacuo. The precipitate was dissolved in 30 ml. of chloroform which was evaporated to 8 ml. on a steam bath. To the warm solution was added about 50 ml. ether and crystallization resulted to yield lincomycin tetraacetate·HCl having a melting point of 226–233° C.; and optical rotation $[\alpha]_D^{25}$=+149° (c., 1, in $H_2O$); and the following elemental analysis:

Analysis.—Calcd. for $C_{26}H_{42}N_2O_{10}S \cdot HCl \cdot \frac{1}{2}H_2O$: C, 50.35; H, 7.15; N, 4.52; O, 27.09; S, 5.17; Cl, 5.72; eq. wt., 620; $H_2O$, 1.45; acetyl, 27.8. Found: C, 49.83; H, 7.57; N, 4.52; O, 27.10; S, 4.99; Cl, 5.81; eq. wt., 605; $H_2O$, 1.72; acetyl, 25.53.

A 5 gm. quantity of lincomycin tetraacetate hydrochloride, Part A, was dissolved in a mixture of 50 ml. 1 N hydrochloric acid and 2 ml. ethanol and stored 4 hours at room temperature. The solution was adjusted to pH 8 with 6 N sodium hydroxide and extracted three times with 50 ml. of chloroform. The extract was washed with water, dried over magnesium sulfate, and evaporated to dryness, yielding 3.4 gm. of syrupy material. This material was distributed in a counter-current distribution system consisting of ethyl acetate:cyclohexane:95% ethanol:water (27:23:30:20) for a total of 500 transfers. A peak fraction from tubes 300–345, K=1.67, was isolated by evaporation of the solvent and freeze-drying to yield 480 mg. of lincomycin 2,3,4-triacetate.

Analysis.—Calcd. for $C_{23}H_{40}N_2O_9S$: C, 54.12; H, 7.57; N, 5.26; S, 6.02. Found: C, 53.90; H, 7.90; N, 4.99; S, 5.94.

(B) Dissolve 40 gm. of lincomycin 2,3,4-triacetate in 500 ml. of dry pyridine. Silanize by adding 100 ml. of hexamethyldisilazane and 50 ml. of trimethylchlorosilane. Stir the reaction mixture for about two hours. Remove the pyridine by evaporation. Dissolve the residue in dilute acetic acid-methanol and again take to dryness. Dissolve the residue in chloroform, wash with water. Take the chloroform phase to dryness to yield the 7-monosubstituted trimethylsilyl ether of the trisacetate. Remove the acetate groups as before to yield 7-O-(trimethylsilyl)-lincomycin.

EXAMPLE 5

2,3,4,7-tetra(trimethylsilyl)ether of N-demethyl-N-ethyllincomycin (A) preparation of N-demethyllincomycin (3, Table I):

A soil slant of *Streptomyces lincolnensis* var. *lincolnensis*, NRRL 2936, was used to inoculate a series of 500-ml. Erlenmeyer flasks each containing 100 ml. of sterile preseed medium consisting of the following ingredients:

| | |
|---|---|
| Yeastolac [1] | gm__ 10 |
| Glucose monohydrate | gm__ 10 |
| N-Z Amine B [2] | gm__ 5 |
| Tap water, q.s., 1 liter | |

[1] Yeastolac is a protein hydrolysate of yeast cells.
[2] N-Z Amine B is Sheffield's enzymatic digest casein.

The preseed medium post sterilization pH was 7.3. The preseed was grown for 2 days at 28° C. on a Gump rotary shaker operating at 250 r.p.m. with a 2½ inch stroke.

Preseed inoculum (600 ml.), described above, was used to inoculate a 400-liter seed tank containing 250 liters of the following sterile seed medium:

| | |
|---|---|
| Glucose monohydrate | gm__ 10 |
| Yeast | gm__ 10 |
| Distillers solubles | gm__ 5 |
| Sodium chloride | gm__ 4 |
| Tap water, q.s., 1 liter. | |

Adjust pH to 7-7.2 with a 50% solution of sodium hydroxide, then add one gram/liter $CaCO_3$ and 2 ml./liter lard oil. Sterilize for 30 minutes at 121° C.

The seed inoculum was grown for 48 hours at a temperature of 28° C., aeration rate of 100 standard liters/minute, and agitated at a rate of 280 r.p.m.

A 5% inoculum of the seed described above (12.5 liters) was used to inoculate a 400-liter fermentation tank containing 250 liters of the following sterile fermentation medium; pH 7.2 by 50% NaOH adjustment prior to sterilization.

| | |
|---|---|
| Glucose monohydrate | gm__ 15 |
| Starch | gm__ 40 |
| Molasses | gm__ 20 |
| Wilson's Peptone Liquor No. 159 [1] | gm__ 10 |
| Corn steep liquor | gm__ 20 |
| Calcium carbonate | gm__ 8 |
| Lard oil | ml__ 5 |
| Tap water, q.s., 1 liter. | |

[1] Wilson's Peptone Liquor No. 159 is a preparation of enzymatically hydrolyzed proteins from animal origin.

Two gms./liter of methyl α-thiolincosaminide (MTL), otherwise methyl-6-amino-6,8-dideoxy-1-thio-D-erythro-α-D-galacto-octopyranoside, was fed into the above fermentation at 48 hours. The methyl thiolincosaminide was prepared as follows: A solution of 40 gm. of lincomycin in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline methyl α-thiolincosaminide after drying in vacuo at room temperature was 21 gm. (84%). Recrystallization was accomplished by dissolving methyl α-thiolincosaminide in hot dimethylformamide and adding an equal volume of ethylene glycol dimethyl ether. Methyl α-thiolincosaminide has a melting point of 225–228° C., an optical rotation of $[\alpha]_D^{25}$ +276° (c.=.768, water and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

The culture was grown for 90 hours at a temperature of 28° C., aeration rate of 200 standard liters per minute, and agitated at a rate of 280 r.p.m. The preharvest whole broth assay against *S. lutea* was 204 mcg./gm. The assay against *Sarcina lutea* is conducted on agar buffered to pH 6–8 with pH 7.0 phosphate buffer (0.1 M). A unit volume (0.08 ml.) of solution containing the material to be assayed is placed on a 12.7 mm. assay disc which is then placed on an agar plate seeded with the assay microorganism.

Whole broth (35 liters) from the fermentation was filtered at harvest pH using 4% diatomaceous earth as filter aid. The filtrate was mixed for 30 minutes with 5% activated carbon and then filtered using 5% diatomaceous earth as a filter aid. The filter cake was washed successively with water and 20% aqueous acetone, and eluted once with 70% aqueous acetone, and twice with 90% aqueous acetone. The three acetone eluates (one 70% and two 90%) were combined, concentrated to remove acetone and freeze-dried to give 121.7 gm. of preparation No. 1 which contained lincomycin and lincomycin D or N-demethyllincomycin. (Hydrogen at 1'-N position in lieu of a methyl group.) The carbon cake remaining after the acetone extractions was slurried with n-butanol, acetone, and water (3:3:2) and filtered. The mother liquor was concentrated to remove the butanol-acetone and freeze-dried to give 9 gms. of preparation No. 2 which contained lincomycin and lincomycin D. Parts of preparations 1 and 2, 112 and 6 gms., respectively, were combined and dissolved in 400 ml. of water. The pH of the solution was adjusted to 10 by the addition of 11 ml. of 5 N aqueous sodium hydroxide. This solution was then extracted with 500 ml. of Skellysolve B (isomeric hexanes), and the extract discarded. The remaining aqueous solution (425 ml.) was then extracted 4 times with 250 ml. portions of methylene chloride. The pooled methylene chloride extract (950 ml.) was concentrated to dryness to yield 4.5 gm. of preparation A which contained only lincomycin. The spent aqueous solution was extracted five times with 250 ml. portions of n-butyl alcohol. The combined butanol extract was washed with water and then concentrated to remove butanol and freeze-dried. This preparation was then dissolved in a solution containing 20 ml. of absolute methanol and 29 ml. of 1 N methanolic hydrogen chloride. This solution was mixed with 500 ml. of ethyl ether and the precipitate which formed was isolated by filtration and dissolved in water. The aqueous solution was freeze-dried to a residue, preparation B, which contained lincomycin and lincomycin D.

Preparation B was dissolved in 100 ml. of the lower phase of a solvent system consisting of equal volumes of n-butyl alcohol and water. The solution was mixed with an equal volume of the upper phase of the above-mentioned system, and transferred to an all-glass, Craig counter-current distribution (10 ml. per phase) apparatus. After 930 transfers the distribution was analyzed by solids determination and thin-layer chromatography. Analysis by thin-layer chromatography showed that tubes 104–170 contained predominantly lincomycin D. These tubes were pooled and concentrated in vacuo (approximately 80 ml.) at which time crystalline lincomycin D (200 mg.) precipitated. The filtrate was concentrated further to a volume of 50 ml. and additional crystalline lincomycin D which precipitated was isolated by filtration; yield 200 mg. These two crude crystalline preparations were combined (400 mg.) and dissolved in 17 ml. of water. On the addition of 60 ml. of acetone to this solution, high purity crystalline lincomycin D as free base in the form of colorless long feather crystals precipitated. The crystals were isolated by filtration and dried; yield 170 mg.

*S. hemolyticus*-infected mice were protected subcutaneously with a $CD_{50}$ of 1.8 mg./kg. and orally with a $CD_{50}$ of 24 mg./kg.

(B) preparation of N-demethyl-N-ethyllincomycin (2, Table I):

The lincomycin D free base was dissolved in 20 ml. of methylene chloride and 3 ml. of methanol. After 3 ml. of ethyl iodide was added, the mixture was allowed to stand at room temperature for 2 hours at which time 5 ml. of ethyl iodide was added. The reaction mixture was held at 40° C. for 3 hours, and then room temperature overnight after which it was concentrated to dryness. The residue was dissolved in 30 ml. of water, the pH adjusted to 10.0 with 1 N aqueous sodium hydroxide, and the alkaline solution then extracted three times with methylene chloride. The methylene chloride extracts were concentrated to dryness and the residue dissolved in methanolic hydrogen chloride. This solution was mixed with 3 ml. of acetone and 100 ml. of ether to precipitate 34.4 mg. of N-demethyl-N-ethyllincomycin hydrochloride which was recovered by filtration and dried.

N-demethyl-N-ethyllincomycin hydrochloride has the following physical and chemical characteristics:

*Analysis.*—Calcd. for $C_{19}H_{37}ClN_2O_6S$: C, 49.93; H, 8.16; N, 6.13; S, 7.01; Cl, 7.76. Found: C, 47.77; H, 8.13; N, 6.15; S, 6.45; Cl, 7.36. Molecular weight: 457. Optical rotation: $[\alpha]_D^{25}$ +127° (c., 0.293, water).

*S. aureus*-infected mice were protected subcutaneously with a $CD_{50}$ of 12 mg./kg. In vitro activity was very marked against staphylococci and streptococci by a twofold broth dilution endpoint.

Dissolve 10 gm. of N-demethyl-N-ethyllincomycin in 100 ml. of anhydrous pyridine. Add 15 ml. of hexamethyldisilazane and 2 ml. of trimethyl chlorosilane. After 10 minutes, evaporate to dryness. Redissolve the material in chloroform and wash several times with water. Pass the chloroform solution through a silica gel filter and remove the solvent by evaporation to yield the 2,3,4,7-tetrakis-O-(trimethylsilyl)ether.

EXAMPLE 6

*Tetra(trimethylsilyl)ether of* N-*demethyllincomycin*

10 gm. of the N-demethyllincomycin (Part A of Example 5) is dissolved in 100 ml. of anhydrous pyridine. 10 ml. of hexamethyldisilazane and 2 ml. of trimethylchlorosilane are added. After the reaction has proceeded for about 10 minutes, the whole is evaporated to dryness. The residue is dissolved in chloroform and the chloroform solution is washed several times with water, the aqueous phases being discarded. The chloroform solution is passed through a silica gel filter and the filtrate is concentrated to dryness to yield 2,3,4,7-tetrakis-O-(trimethylsilyl)-N-demethyllincomycin.

EXAMPLE 7

*Tetra(trimethylsilyl)ether of 4'butyl compound (4, Table I)*

4-BUTYLIDENE-1-CARBOBENZOXY-L-PROLINE

Sodium hydride (19 gm.) as a 53% suspension in mineral oil was warmed with 350 ml. of dimethylsulfoxide at a temperature of 70–75° C. until the reaction was complete (about 30 minutes). After cooling to 32° C., 16.2 gm. of butyltriphenylphosphonium bromide was added, and the resulting reaction mixture was stirred for 1 hour to insure complete reaction. A solution of 26 gm. of 4-keto-1-carbobenzoxy-L-proline in 100 ml. of dimethylsulfoxide was added, and the resulting mixture was heated at 70° C. for 3 hours. The reaction mixture was cooled to 25° C. and 1 liter of 2.5% aqueous potassium bicarbonate added. This mixture was washed twice with 700 ml. portions of ether and the ether was discarded after back extracting with 150 ml. of 2.5% aqueous potassium bicarbonate. The bicarbonate solutions were combined and acidified with 4 N hydrochloric acid. The acidified mixture was extracted with four 500-ml. portions of ether. The combined ether extracts were washed successively with 250 ml. of water, three 250-ml. portions of saturated aqueous sodium bisulfite, and 250 ml. of water, and dried over anhydrous sodium sulfate. Evaporation of the solvent under vacuum gave 24 gm. of an oily residue which was 4-butylidene-1-carbobenzoxy-L-proline.

This residue was dissolved in 31 ml. of acetonitrile and treated with 18 ml. of dicyclohexylamine and refrigerated. The crystals were collected, washed with acetonitrile and dried in vacuo giving 21 gm. (46.8%) of the crystalline dicyclohexylamine salt melting at 136–140° C. After two recrystallizations from acetonitrile, an analytical sample was obtained which melted at 142–144° C., and had a rotation of $[\alpha]_D$ −4° (c.=0.99, CHCl₃).

*Analysis.*—Calcd. for $C_{29}H_{44}N_2O_4$: C, 7.86; H, 9.15; N, 5.78. Found: C, 71.69; H, 9.30; N, 5.74.

Ten gms. of the dicyclohexylamine salt of 4-butylidene-1-carbobenzoxy-L-proline was shaken with ether and excess 5% aqueous potassium hydroxide until no solid remained. The layers were separated and each one was backwashed. The aqueous alkaline layer was combined with the backwash from the ether layer and acidified with 4 N hydrochloric acid. The mixture was repeatedly extracted with ether and the ether extracts were combined, dried over sodium sulfate, and evaporated in vacuo to give 6.3 gm. (93%) of 4-butylidene-1-carbobenzoxy-L-proline as an oil.

The oil was hydrogenated in 200 ml. of methanol over 2.1 gm. of 10% platinum on Dowex-1 catalyst under 40 lbs. hydrogen pressure. The catalyst was removed by filtration and the filtrate evaporated to yield 6.3 gm. of 4-butyl-1-carbobenzoxy-L-proline as an oil.

METHYL N-(4-BUTYL-1-CARBOBENZOXY-L-PROLYL)-α-THIOLINCOSAMINIDE

To a solution of 6.3 gm. of 4-butyl-1-carbobenzoxy-L-proline in 75 ml. of distilled acetonitrile cooled to 0° was added 3.46 ml. of triethylamine followed by 3.34 ml. of isobutyl chloroformate. The mixture was stirred at 0° C. (±3°) for 15 minutes. A solution of 6.2 gms. of methyl α-thiolincosaminide (MTL) (see Example 5) in 85 ml. of water was added, and the reaction mixture was stirred at 0° C. for 0.5 hour and at 25° C. for one hour. The reaction product was then filtered and dried yielding 4.57 gms. (37.7%) of methyl N-(4-butyl-1-carbobenzoxy-L-prolyl)-α-thiolincosaminide. The mother liquor was concentrated under vacuum and an additional 4.25 gms. (35.2%) of product recovered. Recrystallization from acetonitrile produced crystals of methyl N-(4-butyl-1-carbobenzoxy-L-prolyl)-α-thiolincosaminide melting at 194–196° C. A second recrystallization from acetonitrile afforded an analytical sample. M.P. 197.5–200° C., $[\alpha]_D$+111° (c.=0.98, MeOH).

*Analysis.*—Calcd. for $C_{26}H_{40}N_2O_8S$: C, 57.75; H, 7.46; N, 5.13; S, 5.93. Found: C, 57.58; H, 7.16; N, 5.50; S, 6.07.

METHYL N-(4-BUTYL-L-PROLYL)-α-THIOLINCOSAMINIDE HYDROCHLORIDE

A solution of 7.8 gm. of methyl N-(4-butyl-1-carbobenzoxy-L-prolyl)-α-thiolincosaminide in 200 ml. of methanol was shaken over 2 gm. of 10% palladium on carbon under 40 lbs. of hydrogen pressure for 17 hours. The catalyst was removed by filtration and the solution concentrated under vacuum. The residue was dissolved in a mixture of 20 ml. of acetone and 20 ml. of water and acidified with 6 N hydrochloric acid. Dilution with 4 volumes of acetone precipitated methyl N-(4-butyl-L-prolyl)-α-thiolincosaminide hydrochloride which was collected by filtration and dried. The crystals, dried at 55° C. under vacuum, weighed 4.7 gm. and melted at 188–194° C. The analytical sample obtained by recrystallization from acetone melted at 197–199° C. and gave $[\alpha]_D$+150° (water, c.=0.89).

*Analysis.*—Calcd. for $C_{18}H_{34}N_2O_6S \cdot HCl$: C, 48.80; H, 7.96; N, 6.32; S, 7.24. Found (corrected for 5.54% water): C, 48.58; H, 8.19; N, 6.04; S, 7.36.

METHYL N-(4-BUTYL-1-METHYL-L-PROLYL)-α-THIOLINCOSAMINIDE HYDROCHLORIDE

A solution of 2.0 gm. of methyl N-(4-butyl-L-prolyl)-α-thiolincosaminide hydrochloride and 2.0 ml. of 37% formalin in 150 ml. of methanol was shaken over 500 mg. of 10% palladium on carbon under 40 lbs. of hydrogen pressure for 3.5 hours. Removal of the catalyst by filtration and the solvent by distillation in vacuo yielded partially crystalline methyl N-(4-butyl-1-methyl-L-prolyl)-α-thiolincosaminide hydrochloride. By thin-layer chromatography on silica gel using a mixture of ethyl acetate, acetone, water (8:4:1) for elution and $KMnO_4$ solution for detection it was found to be chiefly two materials, the cis and trans forms of methyl N-(4-butyl-1-methyl-L-prolyl)-α-thiolincosaminide hydrochloride (hydrochloride of 4, Table I) in a ratio of about 3 to 2.

SEPARATION OF THE CIS AND TRANS FORMS BY CHROMATOGRAPHY

The methyl N-(4-butyl-1-methyl-L-prolyl)-α-thiolincosaminide hydrochloride was dissolved in a mixture of methanol and methylene chloride (1:1) and 1.5 ml. of triethylamine added. To this solution was added 7 gm. of silica gel and the solvent was evaporated under vacuum leaving the antibiotic deposited on the silica gel. This was sifted on top of a chromatographic column of 200 gms. of silica gel packed with a solvent mixture consisting of ethyl acetate, acetone, water in a ratio of 8:4:1. The column was developed with the same solvent and 20 ml. portions were collected. TLC of each fraction as described above showed that fractions 31–38, 310 mg., were essentially trans form and that fractions 49–74, 32 mg., were essentially cis form. Fractions 39–48 consisted of a mixture which could be further separated by repeated chromatography. Each form was dissolved in a few drops of dilute hydrochloric acid and the hydrochloride precipitated by addition of acetone. In this manner, there was obtained 50 mg. of methyl 6,8-dideoxy-6-(1-methyl-trans-4-butyl-L-2-pyrrolidinecarboxamido)-1-thio-D-erythro-α-D-galactooctopyranoside hydrochloride, otherwise the n-butyl compound, No. 4, Table I, M.P. 135–137° C., and about 150 mg. of the cis form hydrochloride softening at 105° C. with further melting at 175–185° C.

The trans form recrystallized from the same solvent-water medium melted at 139–141° C. and had the following analysis:

Analysis.—Calcd. for $C_{19}H_{36}N_2O_6S \cdot HCl$: C, 49.93; H, 8.16; N, 6.13; S, 7.02. Found (corrected for 4.07% $H_2O$): C, 48.81; H, 8.54; N, 6.49; S, 6.67.

Similarly, recrystallization of the cis form gave a product, softening at 108° C. and further melting at about 189° C. (solvated) which had the following analysis:

Analysis.—Calcd. for $C_{19}H_{36}N_2O_6S \cdot HCl$: C, 49.93; H, 8.16; N, 6.13; S, 7.02. Found (corrected for 4.95% water): C, 50.27; H, 9.00; N, 6.05; S, 6.65.

The trans form was about 2.2 times as active as lincomycin by S. lutea assay, about 2 times as active by the broth dilution assay, and 2.5 times as active in mice infected with S. aureus. The cis form was about ½ to ⅓ as active as the trans, being about equal to lincomycin itself.

The two forms are converted into the respective tetra(trimethylsilyl)ethers according to the previously described methods. There are thereby obtained the 2,3,4,7-tetrakis-O-(trimethylsilyl)ethers of the trans and cis forms of the 4'-butyl compound (4, Table I).

EXAMPLE 8

*Tetra(trimethylsilyl)ether of the 4'-pentyl and N-demethyl-N-ethyl-4'-pentyl compounds (5 and 6 of Table I, respectively)*

4-PENTYLIDENE-1-CARBOBENZOXY-L-PROLINE

Following the procedure of Example 7 and substituting the butyltriphenylphosphonium bromide by pentyltriphenylphosphonium bromide, 4-pentylidene-1-carbobenzoxy-L-proline and the dicyclohexylamine salt thereof were obtained. The free acid was an oil but the dicyclohexylamine salt after recrystallization from acetonitrile had a melting point of 124–128° C., an optical rotation of $[\alpha]_D$ −6° (c., 0.762, $CHCl_3$), and the following analysis:

Analysis.—Calcd. for $C_{30}H_{46}N_2O_4$: C, 72.25; H, 9.30; N, 5.62. Found: C, 72.38; H, 9.52; N, 5.97.

4-PENTYL-1-CARBOBENZOXY-L-PROLINE

Hydrogenation by the procedure of Example 7 gave 4-pentyl-1-carbobenzoxy-L-proline as an oil.

METHYL N-(4-PENTYL-1-CARBOBENZOXY-L-PROPYL)-α-THIOLINCOSAMINIDE

Following the procedure of Example 7 and substituting the 4-butyl-1-carbobenzoxy-L-proline by 4-pentyl-1-carbobenzoxy-L-proline, there was obtained methyl N-(4-pentyl-1-carbobenzoxy-L-prolyl)-α-thiolincosaminide having a melting point of 191–193° C., an optical rotation of $[\alpha]_D$ +108° (c.=0.722, MeOH) and the following analysis:

Analysis.—Calcd. for $C_{27}H_{42}N_2O_8S$: C, 58.46; H, 7.63; N, 5.05. Found: C, 58.32; H, 7.52; N, 4.95.

METHYL N-(4-PENTYL-L-PROLYL)-α-THIOLINCOSAMINIDE HYDROCHLORIDE

Hydrogenolysis of methyl N-(4-pentyl-1-carbobenzoxy-L-prolyl)-α-thiolincosaminide by the procedure of Example 7 gave methyl N-(4-pentyl-L-prolyl)-α-thiolincosaminide hydrochloride having a melting point of 212–214° C., an optical rotation of $[\alpha]_D$ +141° (c.=0.968, $H_2O$), and the following analysis.

Analysis.—Calcd. for $C_{19}H_{37}N_2O_6SCl$: C, 49.93; H, 8.16; N, 6.13; S, 7.02. Found: C, 50.22; H, 7.96; N, 6.09; S, 7.18. (Corrected for 5.43% $H_2O$.)

The formalin procedure of Example 7 introduces methyl at 1'-N.

A mixture of 2.0 gm. of methyl N-(4-pentyl-L-prolyl)-α-thiolincosaminide hydrochloride, 1.5 ml. of acetaldehyde, and 150 mg. of 10% palladium on carbon in 150 ml. of methanol was shaken under 35 lbs. of hydrogen pressure for 5.5 hours. The catalyst was removed by filtration to give a residue consisting chiefly of the cis and trans forms of methyl N-(1-ethyl-4-pentyl-L-prolyl)-α-thiolincosaminide hydrochloride. These are forms of the N-ethyl, 4'-pentyl compound (6, Table I).

The mixture (2 gm.) was chromatographed over 200 gm. of silica gel using for elution a solvent system of ethyl acetate, acetone, water (8:4:1). Fractions 33–42 which by TLC were found to be pure trans were combined, and fractions 49–64 which were essentially pure cis were also combined. Fractions 43–48 were a mixture which could be purified by rechromatography. Each form was dissolved in a few drops of dilute hydrochloric acid and the crystalline hydrochloride precipitated on dilution with a large volume of ether. The solvated trans hydrochloride (crystallized from aqueous acetone) had a melting point of 90–95° C. (dec.).

The 4'-pentyl and the N-demethyl-N-ethyl-4-pentyl compounds are individually silylated according to the previous procedures to yield in each case the tetra(trimethylsilyl)ether. These tetrasilyl ethers can be converted into the tri(trimethylsilyl), di(trimethylsilyl) and mono (trimethylsilyl)ether compounds in accordance with the previously described procedures.

EXAMPLE 9

*Tetra(trimethylsilyl)ether of 4'hexyl compound (No. 7, Table I)*

4-HEXYLIDENE-1-CARBOBENZOXY-L-PROLINE AND THE DICYCLOHEXYLAMINE SALT THEREOF

Following the procedure of Example 7, but substituting the butyltriphenylphosphonium bromide by hexyltriphenylphosphonium bromide, 4-hexylidene-1-carbobenzoxy-L-proline and the dicyclohexylamine salt thereof were obtained. The free acid was an oil but the dicyclohexylamine salt after recrystallization from acetonitrile had a melting point of 109–111° C., an optical rotation of $[\alpha]_D$ —7° (c., 0.941, CHCl$_3$), and the following analysis:

*Analysis.*—Calcd. for $C_{30}H_{48}N_2O_4$: C, 72.62; H, 9.44; N, 5.46. Found: C, 72.70; H, 9.43; N, 5.71.

4-HEXYL-1-CARBOBENZOXY-L-PROLINE

Hydrogenation by the procedure of Example 7 gave 4-hexyl-1-carbobenzoxy-L-proline as an oil.

METHYL N-(HEXYL-1-CARBOBENZOXY-L-PROLYL)-α-THIOLINCOSAMINIDE

Following the procedure of Example 7, but substituting the 4-butyl-1-carbobenzoxy-L-proline by 4-hexyl-1-carbobenzoxy-L-proline there was obtained methyl N-(4-hexyl-1-carbobenzoxy-L-prolyl)-α-thiolincosaminide having a melting point of 176–180° C., an optical rotation of $[\alpha]_D$+103° (c.=0.951, methanol), and the following analysis:

*Analysis.*—Calcd. for $C_{29}H_{44}N_2O_8S$: C, 59.13; H, 7.80; N, 4.93; S, 5.64. Found: C, 59.16; H, 7.46; N, 5.09; S, 5.96.

The carbobenzoxy group at 1'-N is removed and replaced by a methyl group as in the earlier examples, utilizing methanol, palladium on carbon, hydrogen and formalin to yield the 4'-hexyl compound (No. 7, Table I). In vitro tests of minimal inhibitory concentrations against staphylococci, streptococci and other organisms showed marked antibacterial activity in a broth dilution assay. Silylation is carried out according to the described methods to yield the tetrakis(trimethylsilyl)ether of 4'-hexyl compound, otherwise tetrakis(trimethylsilyl)ether of methyl 6,8-dideoxy-6-(1-methyl-trans-4-hexyl-L-2-pyrrolidinecarboxamido) - 1 - thio-D-erythro-α-D-galacto-octopyranoside.

EXAMPLE 10

*Trimethylsilyl ether of 7-chloro-7-deoxylincomycin*

(A) 7-chloro-7-deoxylincomycin and its hydrochloride:

A solution of Rydon reagent [J. Chem. Soc., 2224 (1953); ibid., 2281 (1954); ibid., 3043 (1956)] was prepared by stirring a dry solution of 52.6 gm. (0.2 M) of triphenylphosphine and 800 ml. of acetonitrile at 30° under nitrogen with 10 ml. (0.19 M) of chlorine added over a 20-minute period. After stirring for 10 minutes more, 8.2 gm. of lincomycin was added and the reaction stirred at 30° for 18 hours. A white solid was then present. The reaction was filtered and the solid discarded. Methanol (100 ml.) was added to the filtrate and the solvents then evaporated under vacuum. The viscous residue was dissolved in 100 ml. methanol, diluted with 1800 ml. of water and extracted six times with 200-ml. portions of ether. The ether extracts were discarded, the aqueous phase made basic (pH 11) with aqueous KOH and then extracted four times with 200-ml. portions of methylene chloride. The extracts were dried and evaporated, leaving 11 gm. of a yellow solid which was chromatographed over 1 kg. of silica gel using methanol: chloroform 1:9 (v./v.) as the solvent system. After a forerun of 1200 ml., 22 fractions of 56 ml. were collected. The last 6 (fractions 17–22) were pooled and evaporated to dryness yielding 2.8 gm. of 7-chloro-7-deoxylincomycin. This was converted to the hydrochloride by dissolving in water, adding HCl to pH 1, filtering, and lyophilizing the filtrate.

In one test, *S. aureus*-infected mice were protected orally with a CD$_{50}$ of 20 mg./kg. In another test the protective dose was 11 mg./kg. against *S. aureus* and 3.4 mg./kg. against *S. hemolyticus*. Subcutaneously the protective dose was 1.8 mg./kg. against *S. hemolyticus* and 13 mg./kg. against *S. aureus*.

In vitro, two-fold broth dilution tests in brain heart infusion broth showed very marked antibacterial action against staphylococci, streptococci and other test organisms.

(B) Dissolve 40 gm. of 7-chloro-7-deoxylincomycin in 500 ml. of dry pyridine. Silylate by adding 100 ml. of hexamethyldisilazane and 50 ml. of trimethylchlorosilane. Stir the reaction mixture for about 2 hours at about 25° C. Remove the pyridine by evaporation. Dissolve the residue in chloroform. Wash the chloroform solution several times with water and discard the water washes. Filter the chloroform phase through silica gel and evaporate the filtrate to dryness. Yield 52.3 gm. of 2,3,4-tris-O-(trimethylsilyl)ether of 7-chloro-7-deoxy-lincomycin.

*Analysis.*—Calcd. for $C_{27}H_{57}ClN_2O_5SSi_3$: C, 50.55; H, 8.94; Cl, 5.53; N, 4.37; S, 5.00. Found: C, 50.20; H, 8.72; Cl, 5.66; N, 4.14; S, 4.46.

Oral protective dose in mice (CD$_{50}$) against *S. aureus* is 81 mg./kg. (base equivalent=51 mg./kg.).

EXAMPLE 11

The N-demethyl-N-ethyllincomycin of Example 5 is converted into the compound having a chlorine substituent at the 7-position according to the method of Example 10. The chloro compound is then silylated as described to yield the 2,3,4-tris-O-(trimethylsilyl)ether of N-demethyl-N-ethyl-7-chloro-7-deoxylincomycin.

EXAMPLE 12

The 4'-pentyl compound of Example 8 is converted into the compound having a chlorine substituent at the 7-position according to the method of Example 10. The chloro compound is then silylated as described to yield the 2,3,4-tris-O-(trimethylsilyl)ether of methyl 7-chloro-7 - deoxy-6,8 - dideoxy - 6 - (1 - methyl-trans - 4 - pentyl-L - 2 - pyrrolidinecarboxamido) - 1 - thio - D - erythro-α-D-galacto-octopyranoside.

EXAMPLE 13

The 4'-pentyl-N-ethyl compound of Example 8 is converted into the compound having a chlorine substituent at the 7-position according to the procedure of Example 10. The resulting compound is silylated as described to yield the corresponding tris(trimethylsilyl)ether.

EXAMPLE 14

*Trimethylsilyl ethers of lincomycin C*

Lincomycin C, having an ethyl group attached to the sulfur in lieu of the methyl group as in lincomycin, is ethyl 6,8 - dideoxy-6-(1-methyl - trans-4-propyl-2-pyrrolidinecarboxamido - 1 - thio-D-erythro-α-D-galacto-octopyranoside. It is prepared as follows:

Lincomycin is reacted with ethanthiol (ethyl mercaptan) to form a diethyl dithioacetal followed by heating in the presence of p-toluenesulfonic acid or by fusion. The following procedure is illustrative.

(1) 6,8-DIDEOXY-6-(TRANS-1-METHYL - 4 - PROPYL-L-2-PYRROLIDINE-CARBOXAMIDO) - D - ERYTHRO-D-GALACTO-ALDEHYDO-OCTOSE DIETHYL DITHIOACETAL

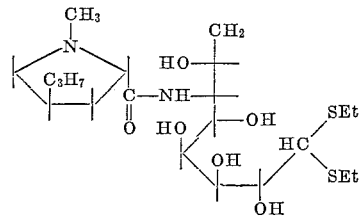

In a 1-liter, 3-necked flask were placed concentrated hydrochloric acid (150 cc.) and ethanethiol (50 cc., previously cooled to 0° C.), followed by lincomycin hydrochloride (15.0 gm.). After stirring magnetically at room temperature for 5 hours, the reaction mixture was diluted with an equal volume of ice water, and the solution extracted thoroughly with Skellysolve B (technical hexane), these extracts being discarded.

The majority of the acid was neutralized by the careful addition of solid potassium hydroxide (100 gm.), keeping the temperature of the well-stirred reaction mixture between 20 and 30° C. by cooling in acetone-Dry Ice. Solid potassium chloride was removed by filtration, and the solid washed well with chloroform. Additional chloroform was added to the filtrate (ca. 150 cc.) and the mixture, stirred magnetically, was adjusted to pH 10 by the addition of aqueous sodium hydroxide (2 N). The chloroform layer was separated, the aqueous layer extracted thoroughly with chloroform, the combined extracts washed twice with water, and dried over anhydrous sodium sulfate. Removal of the solvent at 30° C. in vacuo gave a semi-solid residue, which on being crystallized from acetone, gave 5.41 gm. of 6,8-dideoxy-6-(trans-1-methyl - 4 - propyl-L-2-pyrrolidine-carboxamido) - D - erythro - D - galactoaldehydo-octose diethyl dithioacetal as colorless flattened needles, M.P. 130–132° C. Concentration of the mother-liquors gave additional material (1.50 gm.), M.P. 129–131° C. (Total yield, 6.91 gm., 42.4%).

*Analysis.*—Calcd. for $C_{21}H_{42}O_6N_2S_2$: C, 52.25; H, 8.77; N, 5.81; S, 13.29. Found: C, 52.38; H, 8.71; N, 5.93; S, 13.46.

(2) CYCLIZATION TO LINCOMYCIN C (a) One part each of the diethyl dithioacetal of Part B(1) and p-toluenesulfonic acid monohydrate were refluxed in 25 parts of acetonitrile until substantial antibacterial activity was obtained. The reaction mixture was cooled and evaporated to dryness and chromatographed on silica gel using a solvent mixture of ethyl acetate, acetone and water in the ratio of 8:5:1, respectively. Fractions showing antibacterial activity were pooled, evaporated to dryness, and crystallized from acetone acidified with hydrochloric acid and recrystallized by dissolving in water and adding acetone to give crystals of lincomycin C hydrochloride, M.P. 149–153° C.

Trimethylsilyl ethers of lincomycin C and its analogs wherein substituents are as detailed supra are prepared according to the described methods.

EXAMPLE 15

*Other trimethylsilyl ethers*

Additional starting materials for the preparation of trimethylsilyl ethers are prepared according to the hereinbefore described general and specific methods of preparation. These additional starting materials round out the lincomycin compounds wherein the substituent $R_1$ at the 1′-N position is hydrogen, methyl, ethyl, propyl, butyl, nonyl, decyl, undecyl, or dodecyl, and the isomeric forms thereof; also, those wherein the $R_2$ substituent at the 4′-position is propyl, butyl, pentyl, hexyl, heptyl, octyl, nonyl decyl, undecyl, or dodecyl, and the isomeric forms thereof; also those wherein the $R_3$ substituent at the 1-position is methyl or ethyl; and also those wherein the X substituent at the 7-position is chlorine, bromine, or hydroxyl.

The novel trimethylsilyl ethers, in effective amounts for antimicrobial and anti-infective action, are compounded into pharmaceutical compositions for oral and injectable use, for example, tablets, suspensions, granules, emulsions, capsules, syrups and elixirs; sterile oil solutions, sterile aqueous suspensions and sterile powders for injection; and the like. In such compositions compatible excipients, carriers, diluents, preservatives and the like are used to form compositions consisting essentially of the mono-, di-, tri- and tetra(trimethyl)ethers of the aforesaid lincomycin and its derivatives. Unitary dosage forms designed and suitable for providing anti-infective action in mammals are preferred. They generally contain from about 50 to about 1000 mg. of the essential active ingredient per solid unitary dosage form and from about 5 to about 50% by weight of liquid unitary dosage forms. These amounts are effective for anti-infective action.

The following pharmaceutical compositions are preferred embodiments of a pharmaceutical composition utilizing the trimethylsilyl ethers of this invention.

EXAMPLE 16

*Aqueous suspension*

Ten liters, each ml. containing 50 mg. of tris-O-(trimethylsilyl)lincomycin, is prepared according to the following formula:

| | | |
|---|---|---|
| 2,3,4-tris-O-(trimethylsilyl)lincomycin | gm | 500 |
| Preservative | gm | 10 |
| Glycerin | ml | 3,000 |
| Tragacanth powder | gm | 100 |
| Purified water, U.S.P., q.s. ad | ml | 10,000 |

The suspension provides an essentially tasteless preparation in contrast to the usually orally administered lincomycin hydrochloride-containing preparations.

EXAMPLE 17

*Oil solution*

A 30% w./v. solution of the tetrakis-O-(trimethylsilyl)lincomycin, sterilized as required, is prepared in a suitable vegetable oil, e.g., peanut oil. The solution is suited for intramuscular injection to provide sustained blood levels of active ingredients.

What is claimed is:

1. Trimethylsilyl ethers of free base and acid addition salt forms of compounds of the formula

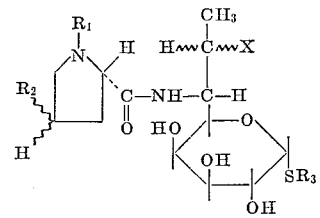

wherein $R_1$ is selected from the group consisting of hydrogen and alkyl containing 1 to 8 carbon atoms, inclusive; $R_2$ is alkyl containing 3 to 12 carbon atoms, inclusive; $R_3$ is selected from the group consisting of methyl and ethyl; and X is selected from the group consisting of chlorine, bromine and hydroxyl.

2. Tetra(trimethylsilyl)ethers according to claim 1.
3. Tris(trimethylsilyl)ethers according to claim 1.
4. Bis(trimethylsilyl)ethers according to claim 1.
5. Mono(trimethylsilyl)ethers according to claim 1.
6. Trimethylsilyl ethers of claim 1, wherein $R_1$ is ethyl, $R_2$ is n-propyl, $R_3$ is methyl and X is hydroxyl.
7. Trimethylsilyl ethers of claim 1, wherein $R_1$ is methyl, $R_2$ is n-pentyl, $R_3$ is methyl and X is hydroxyl.
8. Trimethylsilyl ethers of claim 1, wherein $R_1$ is ethyl, $R_2$ is n-pentyl, $R_3$ is methyl and X is hydroxyl.
9. Trimethylsilyl ethers of claim 1, wherein $R_1$ is ethyl, $R_2$ is n-propyl, $R_3$ is methyl and X is chloro.
10. Trimethylsilyl ethers of claim 1, wherein $R_1$ is methyl, $R_2$ is n-pentyl, $R_3$ is methyl and X is chloro.
11. Trimethylsilyl ethers of claim 1, wherein $R_1$ is ethyl, $R_2$ is n-pentyl, $R_3$ is methyl and X is chloro.
12. 2,3,4,7-tetrakis-O-(trimethylsilyl)ether of claim 1, wherein $R_1$ is methyl, $R_2$ is n-propyl, $R_3$ is methyl and X is hydroxyl.
13. 2,3,4-tris-O-(trimethylsilyl)ether of claim 1, wherein $R_1$ is methyl, $R_2$ is n-propyl, $R_3$ is methyl and X is hydroxyl.
14. 2,3,4-tris-O-(trimethylsilyl)ether of claim 1, wherein $R_1$ is methyl, $R_2$ is n-propyl, $R_3$ is methyl and X is chloro.
15. A pharmaceutical composition comprising in unit dosage form an effective amount of a trimethylsilyl ether according to claim 1 in association with a pharmaceutical carrier.

References Cited

UNITED STATES PATENTS 2,746,956  5/1956   Speier _____ 260—210
3,282,918  11/1966  Hoeksema et al. ____ 260—210

LEWIS GOTTS, *Primary Examiner.*

J. R. BROWN, *Assistant Examiner.*

U.S. Cl. X.R.

99—4; 162—175; 195—86; 260—210, 326.3